United States Patent
Shimamura (10) Patent No.: US 10,875,036 B2
(45) Date of Patent: Dec. 29, 2020

(54) END FACE COATING APPARATUS (71) Applicant: Shoda Techtron Corp., Hamamatsu (JP)

(72) Inventor: Tetsuya Shimamura, Hamamatsu (JP)

(73) Assignee: SHODA TECHTRON CORP., Hamamatsu (JP)

( * ) Notice: Subject to any disclaimer, the term of this patent is extended or adjusted under 35 U.S.C. 154(b) by 32 days.

(21) Appl. No.: 16/069,552

(22) PCT Filed: Jan. 12, 2017

(86) PCT No.: PCT/JP2017/000816
§ 371 (c)(1),
(2) Date: Jul. 12, 2018

(87) PCT Pub. No.: WO2017/126408
PCT Pub. Date: Jul. 27, 2017

(65) Prior Publication Data
US 2019/0015848 A1 Jan. 17, 2019

(30) Foreign Application Priority Data
Jan. 22, 2016 (JP) .................................. 2016-010351

(51) Int. Cl.
*B05B 1/14* (2006.01)
*B05B 13/04* (2006.01)
(Continued)

(52) U.S. Cl.
CPC ................. *B05B 1/14* (2013.01); *B05B 13/04* (2013.01); *B05C 5/02* (2013.01); *B05C 5/0204* (2013.01);
(Continued)

(58) Field of Classification Search
USPC ........ 118/300, 679–681, 313–315, 305, 321, 118/323
See application file for complete search history.

(56) References Cited

U.S. PATENT DOCUMENTS 8,287,965 B2 10/2012 Aoki ........................ 427/421.1
9,956,566 B2 5/2018 Okada et al. ....... B05B 13/0636
(Continued)

FOREIGN PATENT DOCUMENTS

CN 1406156 A 3/2003
CN 1763976 A 4/2006
(Continued)

*Primary Examiner* — Yewebdar T Tadesse
(74) *Attorney, Agent, or Firm* — Michael Tobias

(57) ABSTRACT

An end-face coating apparatus for applying a fluid to an end face of a glass substrate includes a workpiece holder and a fluid dispenser. The workpiece holder has a holding surface for holding a glass substrate in a horizontal position such that an end face of the glass substrate projects from the workpiece holder. The fluid dispenser extends in a vertical direction orthogonal to the main faces of the glass substrate and has a nozzle. A dispensing opening for dispensing a fluid is formed on the outer circumferential surface of the nozzle. The dispensing opening has a size equal to or smaller than the width of the end face as measured in the thickness direction of the glass substrate. The fluid dispenser is moved relative to the glass substrate by a Z-axis drive mechanism, a θ-axis drive mechanism, a Y-axis drive mechanism, and an X-axis drive mechanism.

19 Claims, 6 Drawing Sheets (A)

(B)

(51) Int. Cl.
*B05C 5/02* (2006.01)
*C03C 17/32* (2006.01)
*B05C 13/02* (2006.01)

(52) U.S. Cl.
CPC .............. *C03C 17/32* (2013.01); *B05C 13/02* (2013.01); *C03C 2217/78* (2013.01); *C03C 2218/11* (2013.01); *C03C 2218/112* (2013.01)

(56) References Cited

U.S. PATENT DOCUMENTS

| | | | |
|---|---|---|---|
| 2004/0081759 A1 | 4/2004 | Maruyama et al. | 427/256 |
| 2011/0104365 A1* | 5/2011 | Hidaka | H01L 31/048 427/74 |
| 2013/0273252 A1* | 10/2013 | Miyamoto | B05D 3/12 427/348 |
| 2013/0289764 A1 | 10/2013 | Kwon et al. | 700/232 |
| 2015/0030816 A1 | 1/2015 | Uemura et al. | 428/192 |

FOREIGN PATENT DOCUMENTS

| | | | |
|---|---|---|---|
| CN | 1919767 A | 2/2007 | |
| CN | 101962710 A | 2/2011 | |
| JP | H2-28741 U | 2/1990 | |
| JP | H11-239751 A | 9/1999 | |
| JP | 2004-337778 A | 12/2004 | |
| JP | 2005-095792 A | 4/2005 | |
| JP | 2005095792 A * | 4/2005 | |
| JP | 2006-148050 | 6/2006 | |
| JP | 2007-230849 A | 9/2007 | |
| JP | 4109754 B2 | 7/2008 | |
| JP | 2010-193689 A | 9/2010 | |
| JP | 2010-214365 | 9/2010 | |
| JP | 2010193689 A * | 9/2010 | ............ H02K 15/12 |
| JP | 2010-234364 | 10/2010 | |
| JP | 2013-220422 | 10/2013 | |
| JP | 2013-229332 A | 11/2013 | |
| JP | 2014-115614 | 6/2014 | |
| JP | 2015-182910 A | 10/2015 | |
| JP | 2015-202429 A | 11/2015 | |
| WO | 2015/162951 A1 | 4/1917 | |
| WO | 2013/154034 A1 | 12/2015 | |

\* cited by examiner

END FACE COATING APPARATUS

TECHNICAL FIELD

The present invention relates to an end face coating apparatus for applying a fluid to an end face of a glass substrate formed into a plate-like shape.

BACKGROUND ART

A thin plate-shaped glass substrate is used to constitute a liquid crystal display for a cellular phone, a smart phone, a tablet-type device, a liquid crystal television, an organic EL display device, etc. Conventionally, in order to prevent breakage or chipping of such a glass substrate, a protective layer formed of a resin material is provided on the end face of the glass substrate (see Patent Document 1 listed below). The protective layer is formed by, for example, a method disclosed in Patent Document 1. Specifically, through use of a dispenser, an uncured (fluid) resin material which cures upon UV irradiation is applied to the end face of the glass substrate.

A dispenser for applying a fluid to the end face of a thin plate-shaped object to be coated (an end face coating apparatus) has, for example, a structure as disclosed in Patent Document 2 listed below. Specifically, a rod having a flange projects from the distal end of a tubular body so that a recess for receiving an object to be coated is formed on the forward side of the tubular body. The fluid is supplied to the recess so as to apply the fluid onto the end face of the object to be coated.

PRIOR ART DOCUMENTS

Patent Documents

Patent Document 1: Japanese Patent Application Laid-Open (kokai) No. 2015-182910
Patent Document 2: Japanese Patent Application Laid-Open (kokai) No. 2004-337778

However, when the end face coating apparatus disclosed in Patent Document 2 is used, the fluid is applied not only to the end face of the object to be coated but also to edge portions of two main faces of the object adjacent to the end face. Therefore, the end face coating apparatus disclosed in Patent Document 2 is not suitable for a glass substrate which is required to be coated with a fluid only on its end face.

SUMMARY OF THE INVENTION

The present invention was accomplished in order to solve the above-described problem, and its object is to provide an end face coating apparatus which can precisely apply a fluid only to an end face of a glass substrate, which is an object to be coated.

In order to achieve this object, the present invention provides an end face coating apparatus for applying a fluid to an end face of a plate-shaped glass substrate, comprising a workpiece holder for detachably holding the glass substrate; a fluid dispenser having a nozzle which is positioned to face the end face of the glass substrate held on the workpiece holder and which has the shape of a tube with a bottom extending in a direction orthogonal to a main face of the glass substrate and through which the fluid is dispensed; fluid supply means for supplying the fluid to the fluid dispenser; dispenser displacement means for producing relative movement of the fluid dispenser with respect to the workpiece holder; and control means for controlling operation of the fluid supply means and operation of the dispenser displacement means. The nozzle of the fluid dispenser has a dispensing opening which is formed on an outer circumferential surface of the nozzle at a position where the dispensing opening faces the end face of the glass substrate and which has a size equal to or smaller than a width of the end face measured in a thickness direction of the glass substrate. The control means controls the operation of the fluid supply means so as to dispense the fluid from the dispensing opening while controlling the operation of the dispenser displacement means so as to produce relative movement of the nozzle along the end face of the glass substrate.

According to this feature of the present invention, the dispensing opening of the nozzle dispenses the fluid in a state in which the dispensing opening faces the end face of the glass substrate, which is an object to be coated, and the dispensing opening has a size equal to or smaller than the width of the end face as measured in the thickness direction of the glass substrate. Therefore, the end face coating apparatus can precisely apply the fluid only to the end face of the glass substrate. Also, since the nozzle extends in the direction orthogonal to the main faces of the glass substrate, the end face coating apparatus can apply the fluid not only to an end face extending along the outer circumference of the glass substrate but also to an end face extending along the inner circumference of a hole of the glass substrate.

A second feature of the present invention is that the end face coating apparatus further comprises rotation means for rotating the nozzle about its axis, wherein the control means controls operation of the rotation means.

According to the second feature of the present invention, the end face coating apparatus includes the rotation means for rotating the nozzle about its axis. Therefore, the end face coating apparatus can rotate the nozzle in accordance with the direction in which the end face of the glass substrate extends such that the dispensing opening faces the end face. Thus, the end face coating apparatus can efficiently perform the fluid application operation. Also, since the end face coating apparatus can cause the dispensing opening to face toward a direction other than the direction orthogonal to the direction of advance of the nozzle during application of the fluid, such as toward an obliquely forward direction or an obliquely rearward direction with respect to the direction orthogonal to the direction of advance, the end face coating apparatus can change the conditions of application such as the amount of application of the fluid, the thickness of application, and the shape of application. For example, by causing the dispensing opening to face forwards in the direction of advance of the nozzle, the end face coating apparatus can apply the fluid to form a layer having a constant thickness and a flat surface. Also, by causing the dispensing opening to face rearwards with respect to the direction of advance of the nozzle, the end face coating apparatus can apply the fluid to form a layer having a thickness greater than the clearance between the nozzle and the end face and having a convexly curved surface.

A third feature of the present invention is that, in the end face coating apparatus, at least the outer circumferential surface of the nozzle onto which the dispensing opening opens is curved.

According to the third feature of the present invention, at least the outer circumferential surface of the nozzle onto which the dispensing opening opens is curved. Therefore, even when the nozzle comes into contact with the end face of the glass substrate, it is possible to prevent the dispensing opening from being completely closed, whereby the dispensing of the fluid is maintained. Thus, even in such a case, the end face coating apparatus can precisely apply the fluid.

A fourth feature of the present invention is that, in the end face coating apparatus, the workpiece holder can hold a plurality of glass substrates in a stacked state, and the fluid dispenser has a plurality of dispensing openings formed in the nozzle at positions corresponding to the glass substrates and arranged in the axial direction of the nozzle.

According to the fourth feature of the present invention, the workpiece holder can hold a plurality of glass substrates in a stacked state, and the dispensing openings of the fluid dispenser are formed to correspond to the plurality of glass substrates. Therefore, the end face coating apparatus can efficiently apply the fluid to the plurality of glass substrates.

BRIEF DESCRIPTION OF THE DRAWINGS

FIGS. 4(A) to 4(C) are sectional views each showing a state in which a nozzle of the end face coating apparatus shown in FIG. 1 applies a fluid to an end face of a glass substrate, wherein

FIGS. 6(A) and 6(B) show fluid application according to a modification of the present invention, wherein

MODE FOR CARRYING OUT THE INVENTION

Figure 1:
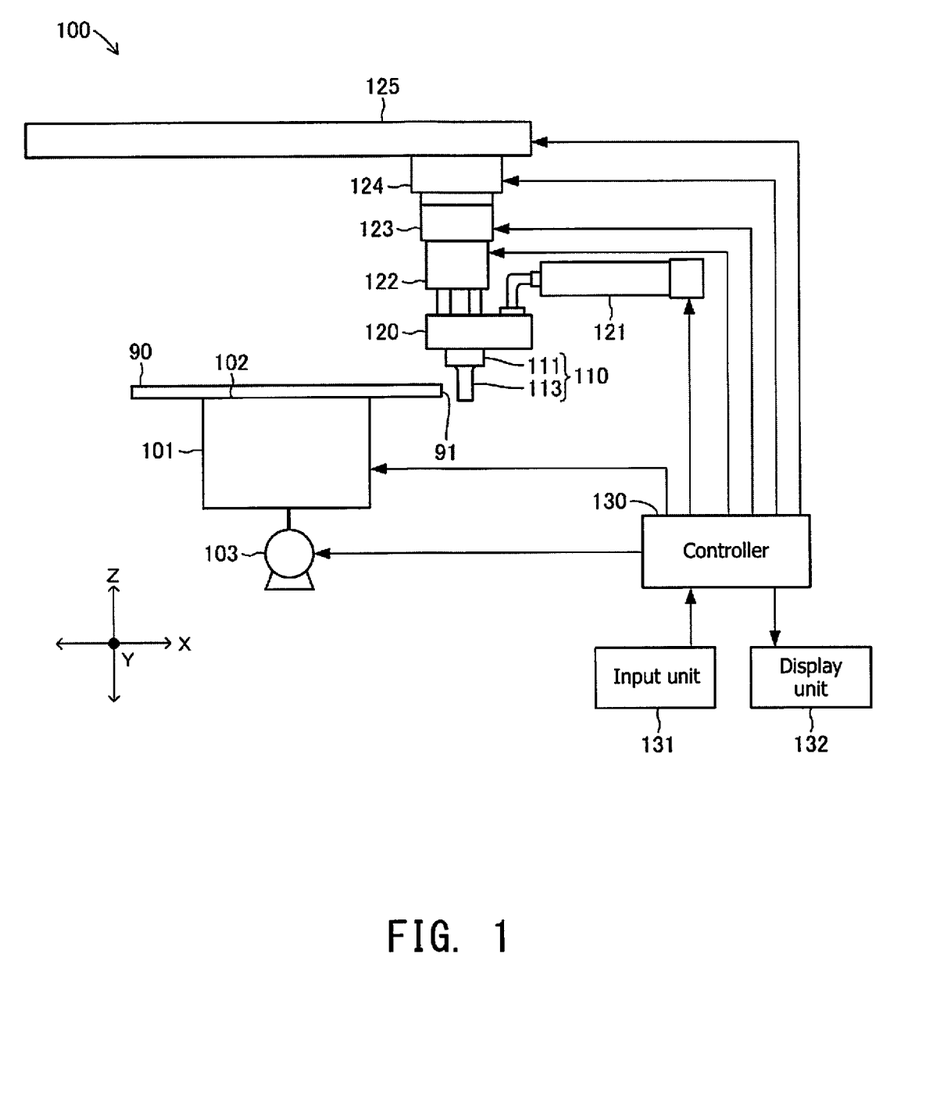
FIG. 1 is a diagram schematically showing the structure of a main portion of an end face coating apparatus according to one embodiment of the present invention.

One embodiment of an end face coating apparatus according to the present invention will now be described with reference to the drawings. FIG. 1 is a diagram schematically showing the structure of a main portion of an end face coating apparatus 100 according to the present invention. In each of the drawings which will be referred to herein, some components are shown schematically, such as in an exaggerated manner so as to facilitate an understanding of the present invention. Therefore, the dimensions, dimensional ratios, etc. of the constituent elements may differ from the actual dimensions, dimensional ratios, etc. The end face coating apparatus 100 is a machine for applying a fluid made of a resin 95, which is a material for forming a protective layer 94, to an end face 91 of a glass substrate 90 which is a component of a liquid crystal display which includes a touch panel and is used in a portable device such as a smart phone.

(Description of the Glass Substrate 90)

Figure 2:
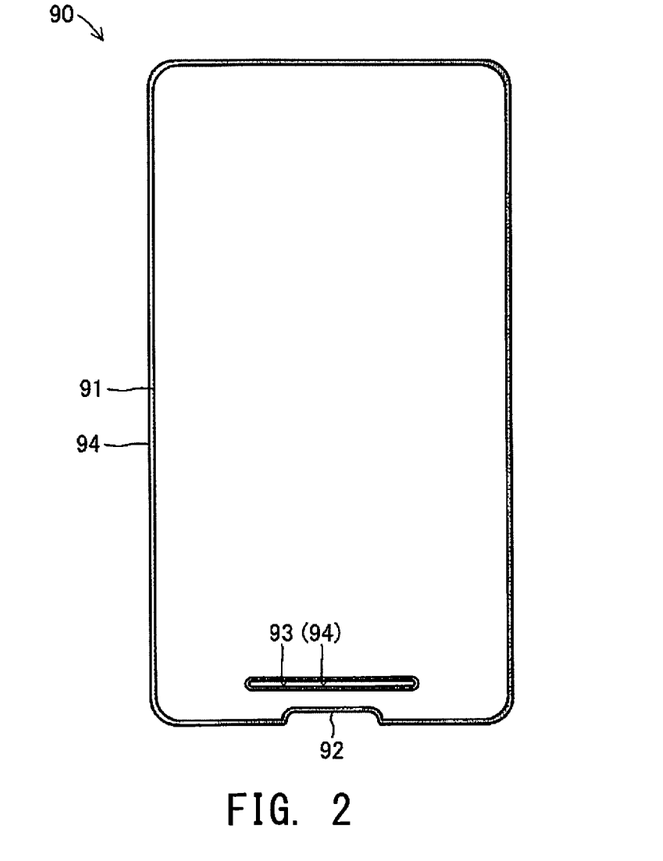
FIG. 2 is a plan view schematically showing the external appearance of a glass substrate, which is a workpiece to which a fluid is applied by the end face coating apparatus shown in FIG. 1.

Before describing the end face coating apparatus 100 according to the present invention, the glass substrate 90, which is a workpiece for the end face coating apparatus 100, will be described. As shown in FIG. 2, the glass substrate 90 is a component of a liquid crystal display used in a portable device such as a smart phone (not shown) and is fabricated by forming a glass material into a plate-like shape. The size of the glass substrate 90 in a plan view is smaller than that of the portable device, and the thickness of the glass substrate 90 is about 0.1 mm to 1.0 mm. In the present embodiment, the glass substrate 90 generally has a rectangular shape in a plan view and measures 130 mm (length)× 70 mm (width)×0.5 mm (thickness).

The glass substrate 90 has a recess 92 formed in the end face 91 which defines the outer circumference of the glass substrate 90. The glass substrate 90 also has a hole 93 formed above the recess 92 in FIG. 2. The recess 92 and the hole 93 are so-called reliefs for avoiding physical contact with other components when the glass substrate 90 is incorporated into a portable device.

The recess 92 is concave with respect to a short side (located on the lower side in FIG. 2) of the four sides of the glass substrate 90 which define the end face 91. In the present embodiment, the recess 92 has a straight bottom surface which is offset inward from the end face 91 by 2 mm and which has opposite ends which are connected to the end face 91 through concavely curved surfaces.

The hole 93 is an elongated through hole which is formed above the recess 92 in FIG. 2 and extends in the widthwise direction of the glass substrate 90. In the present embodiment, the length (the dimension in the widthwise direction of the glass substrate 90) of the hole 93 is 35 mm, and the width (the dimension in the longitudinal direction of the glass substrate 90) of the hole 93 is 2 mm. The hole 93 has rounded opposite ends.

The protective layer 94 is a solid or semi-solid resin layer which is formed on the end face 91 so as to prevent breakage or chipping of the glass substrate 90. The protective layer 94 is formed to have a thickness of 50 micrometers to 1 millimeter. The fluid 95 is an uncured resin material which has fluidity and is used as a material for the solid or semi-solid protective layer 94. Various types of resin materials such as acrylic resins, epoxy resins, ene-thiol-type resins, and polyene-polythiol can be used as the fluid 95. In FIG. 2, the protective layer 94 is denoted by hatching with dots, and its thickness is exaggerated.

(Structure of the End Face Coating Apparatus 100)

The end face coating apparatus 100 includes a workpiece holder 101. The workpiece holder 101 is an apparatus for detachably holding a single glass substrate 90, which is a workpiece. It has a planar holding surface 102 for holding one of the main faces of the glass substrate 90. In order to hold the glass substrate 90 by negative pressure, the holding surface 102 has a plurality of holes through which air is evacuated for generation of the negative pressure. A suction pump 103 which is controlled by a controller 130 (to be described later) and which sucks air is connected to the holes.

The dimensions and shape (a rectangular shape in this embodiment) of the holding surface 102 are determined such that the size of the holding surface 102 in a plan view is smaller than that of the glass substrate 90 and such that the end face 91 of the glass substrate 90 protrudes from the outer circumference (four sides) of the holding surface 102. The workpiece holder 101 is fixedly disposed on an unillustrated support base of the end face coating apparatus 100, and the operation of the workpiece holder 101 is controlled by the controller 130.

Figure 3:
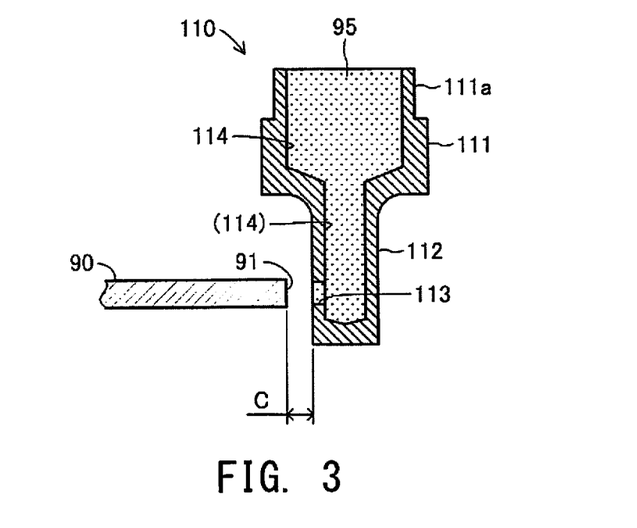
FIG. 3 is a sectional view schematically showing the internal structure of a fluid dispenser used in the end face coating apparatus shown in FIG. 1.

A fluid dispenser 110 is provided above the workpiece holder 101. As shown in FIG. 3, the fluid dispenser 110 is an apparatus for dispensing the fluid 95 onto the end face 91 of the glass substrate 90 held on the workpiece holder 101. It is formed of a metallic material so as to have the shape of a tube with a bottom. More specifically, the fluid dispenser 110 is mainly composed of a cylindrical trunk portion 111 and a nozzle 112 formed on the lower side of the trunk portion 111 in FIG. 3. A flow passage 114 is formed inside the trunk portion 111 and the nozzle 112.

The trunk portion 111 is a portion for supporting the nozzle 112 and for attaching the fluid dispenser 110 to a holder 120. The trunk portion 111 has a stepped cylindrical attachment portion 111a which is attached to the holder 120. The attachment portion 111a has a diameter smaller than that of the remaining portion of the trunk portion 111 adjoining the nozzle 112.

The nozzle 112 is disposed so as to face the end face 91 of the glass substrate 90 held on the workpiece holder 101. The nozzle 112 has the shape of a cylindrical tube with a bottom and has an outer diameter smaller than that of the trunk portion 111. The outer diameter of the nozzle 112 is smaller than the diameter of the hole 93 of the glass substrate 90. In the present embodiment, the outer diameter of the nozzle 112 is set to 1.0 mm. A dispensing opening 113 is formed in the outer circumferential surface of the nozzle 112.

The dispensing opening 113 is an opening for discharging the fluid 95 toward the end face 91 of the glass substrate 90 held on the workpiece holder 101. It is composed of a circular through hole communicating with the flow passage 114. The dispensing opening 113 has a diameter equal to or smaller than the width of the end face 91 as measured in the thickness direction of the glass substrate 90. In the present embodiment, the diameter of the dispensing opening 113 is set to 0.4 mm. In the present embodiment, a single dispensing opening 113 is formed in the outer circumferential surface of the nozzle 112 at a position near the distal end thereof. In the present embodiment, the dispensing opening 113 extends in the horizontal direction orthogonal to the axial direction of the nozzle 112.

The flow passage 114 is a passage for leading the fluid 95 supplied through the holder 120 to the dispensing opening 113. The flow passage 114 is composed of a first flow passage which is formed in the trunk portion 111 and a second flow passage which is formed in the nozzle 112 and which is smaller in diameter than the first flow passage. The fluid dispenser 110 is supported by the holder 120.

The holder 120 is a component which holds the fluid dispenser 110 and a syringe pump 121 and through which the fluid dispenser 110 and the syringe pump 121 communicate with each other. The holder 120 is a block-shaped member formed of a metallic material. Namely, an unillustrated flow passage (not shown) for leading the fluid 95 from the syringe pump 121 to the fluid dispenser 110 is formed inside the holder 120. The holder 120 is supported by a Z-axis drive mechanism 122.

The syringe pump 121 is an apparatus which stores the fluid 95 to be dispensed by the fluid dispenser 110 and discharges the stored fluid 95 into the above-mentioned flow passage within the holder 120 under the control of the controller 130. The syringe pump 121 corresponds to the fluid supply means of the present invention. The syringe pump 121 is detachably held on the holder 120.

The Z-axis drive mechanism 122 is an apparatus for bidirectionally moving the holder 120 in a Z-axis direction (the vertical direction), thereby bidirectionally moving the fluid dispenser 110 in the Z-axis direction. The Z-axis drive mechanism 122 includes a pneumatic cylinder which is controlled by the controller 130. The Z-axis drive mechanism 122 is supported by the θ-axis drive mechanism 123.

The θ-axis drive mechanism 123 is an apparatus for bidirectionally rotating the Z-axis drive mechanism 122 around the Z axis, thereby bidirectionally rotating the fluid dispenser 110 about the Z axis. The θ-axis drive mechanism 123 includes an electric motor (such as a pulse motor) which is controlled by the controller 130. The θ-axis drive mechanism 123 is supported by a Y-axis drive mechanism 124.

The Y-axis drive mechanism 124 is an apparatus for bidirectionally moving the θ-axis drive mechanism 123 in a Y-axis direction orthogonal to the Z-axis direction (perpendicular to the sheet on which FIG. 1 is depicted), thereby bidirectionally moving the fluid dispenser 110 in the Y-axis direction. The Y-axis drive mechanism 124 includes a feed screw mechanism (not shown) including an electric motor (such as a servo motor) which is controlled by the controller 130. The Y-axis drive mechanism 124 is supported by the X-axis drive mechanism 125.

The X-axis drive mechanism 125 is an apparatus for bidirectionally moving the Y-axis drive mechanism 124 in an X-axis direction orthogonal to the Z-axis direction and the Y-axis direction (the horizontal direction in FIG. 1), thereby bidirectionally moving the fluid dispenser 110 in the X-axis direction. The X-axis drive mechanism 125 includes a feed screw mechanism (not shown) including an electric motor (such as a servo motor) which is controlled by the controller 130. The X-axis drive mechanism 125 is supported by an unillustrated support frame of the end face coating apparatus 100.

The controller 130 includes a microcomputer and controls the operation of the workpiece holder 101, the suction pump 103, the syringe pump 121, the Z-axis drive mechanism 122, the θ-axis drive mechanism 123, the Y-axis drive mechanism 124, and the X-axis drive mechanism 125. The controller 130 corresponds to the control means of the present invention. The controller 130 has an input unit 131 including operation switches or the like for receiving instructions from an operator, and a display unit 132 composed of a liquid crystal display for displaying the operational state of the controller 130.

The end face coating apparatus 100 includes a power supply unit for supplying electric power from a power source to various pieces of electrical equipment such as the workpiece holder 101, the suction pump 103, the syringe pump 121, the Z-axis drive mechanism 122, the θ-axis drive mechanism 123, the Y-axis drive mechanism 124, the X-axis drive mechanism 125, and the controller 130. The end face coating apparatus 100 also includes an outer cover for covering the pieces of constituent equipment and a UV light source for irradiating the fluid 95 applied to the end face 91 of the glass substrate 90 with ultraviolet rays so as to cure the fluid 95. However, since the power supply unit, the outer cover, and the UV light source do not relate directly to the present invention, they will not be described herein.

(Operation of the End Face Coating Apparatus 100)

Next, operation of the end face coating apparatus 100 having the above-described configuration will be described. First, an operator who wishes to apply the fluid 95 to the end face 91 of the glass substrate 90 by using the end face coating apparatus 100, thereby forming the protective layer 94 on the end face 91, activates the controller 130 by turning on an unillustrated power switch of the end face coating apparatus 100. As a result, the controller 130 starts its operation by executing a control program previously stored in a storage device such as a ROM and enters a waiting state in which it awaits an instruction from the operator.

Subsequently, the operator sets the glass substrate 90 on the workpiece holder 101. Specifically, the operator disposes the glass substrate 90 on the holding surface 102 of the workpiece holder 101 and activates the suction pump 103 by operating the input unit 131 so as to generate a negative pressure and apply it to the holding surface 102 to hold the glass substrate 90. As a result, the glass substrate 90 is fixedly held in a horizontal attitude on the holding surface 102 of the workpiece holder 101 (see FIG. 1).

In the end face coating apparatus 100, the holding surface 102 may be formed such that the glass substrate 90 is disposed in a predetermined orientation. The end face coating apparatus 100 may include an image capturing device, such as a camera, for capturing the image of the glass substrate 90 held on the holding surface 102 and determine the orientation of the glass substrate 90 by using the captured image. The end face coating apparatus 100 may include a transporting apparatus for grasping the glass substrate 90 and disposing the glass substrate 90 on the holding surface 102. In this case, the glass substrate 90 is disposed on the holding surface 102 using the transporting apparatus. The glass substrate 90 is prepared before being set in the end face coating apparatus 100. Specifically, the glass substrate 90 is formed by cutting a glass plate into a predetermined shape through use of a cutting tool such as a cutter, and the end face 91 of the glass substrate 90 is polished using a grinding tool such as a brush.

Subsequently, the operator applies the fluid 95 to the end face 91 of the glass substrate 90 held on the workpiece holder 101. Specifically, the operator instructs the controller 130 through the input unit 131 to start the operation of applying the fluid 95. In response to this instruction, the controller 130 executes an unillustrated fluid application program so as to start the operation of applying the fluid 95 to the end face 91 of the glass substrate 90.

Specifically, the controller 130 positions the fluid dispenser 110 at a position on the end face 91 of the glass substrate 90 at which the application of the fluid 95 is to be started by controlling the operation of the Z-axis drive mechanism 122, the θ-axis drive mechanism 123, the Y-axis drive mechanism 124, and the X-axis drive mechanism 125. As a result, the fluid dispenser 110 is moved to a position at which the dispensing opening 113 faces the end face 91 with a predetermined clearance C (such as 50 micrometers to 0.1 millimeter) therebetween. The controller 130 may perform the fluid application first for the end face 91 along the outer circumference of the glass substrate 90 and then for the end face 91 along the inner circumference of the hole 93, or it may perform the fluid application first for the end face 91 along the inner circumference of the hole 93 and then for the end face 91 along the outer circumference of the glass substrate 90. However, in the present embodiment, the controller 130 first performs the fluid application for the end face 91 along the outer circumference of the glass substrate 90.

Figure 4:
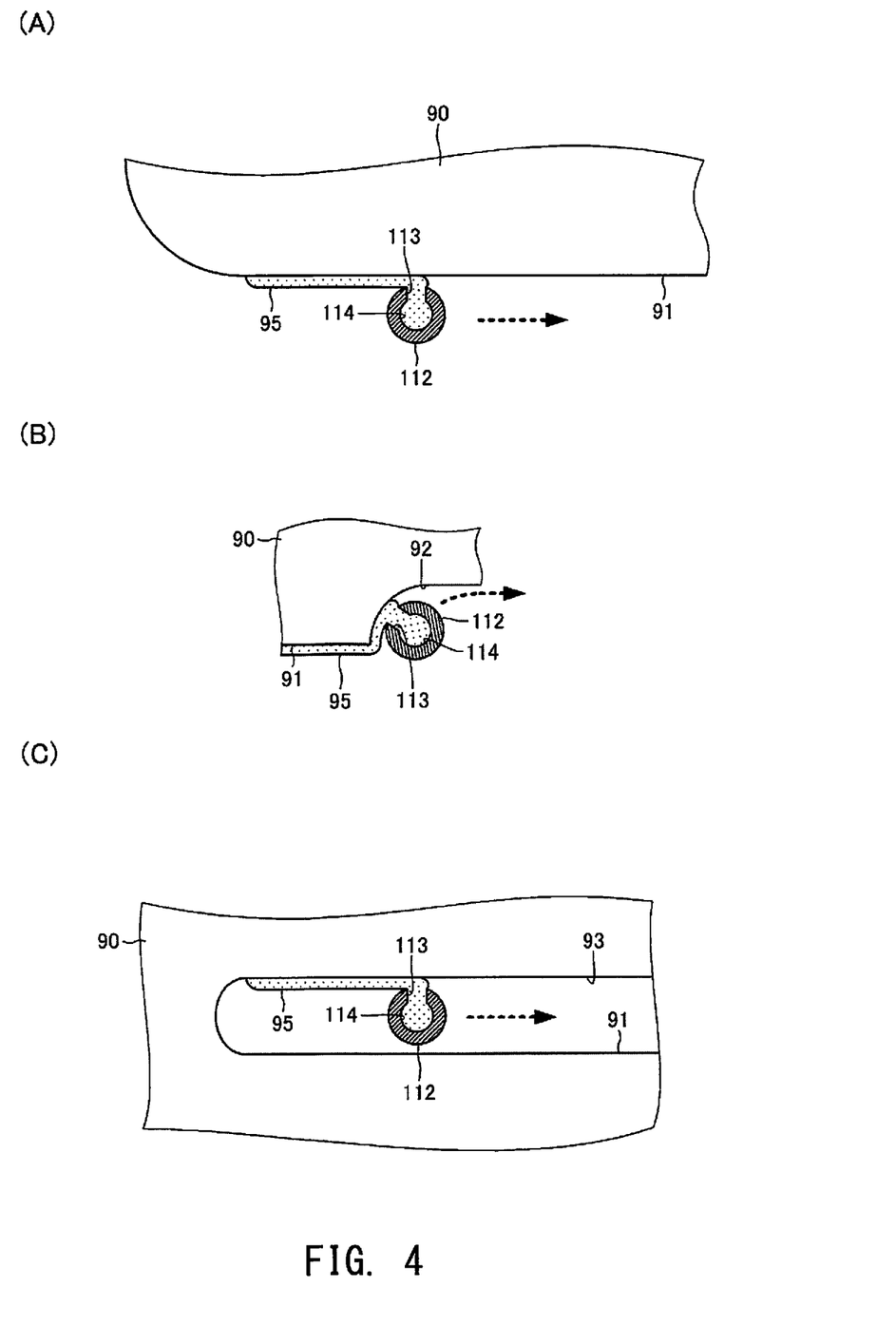
FIG. 4(A) shows a state in which the nozzle applies the fluid to a straight end face of the glass substrate.
FIG. 4(B) shows a state in which the nozzle applies the fluid to an arc-shaped end face of a recess of the glass substrate.
FIG. 4(C) shows a state in which the nozzle applies the fluid to an end face which constitutes the inner surface of a hole of the glass substrate.

Subsequently, the controller 130 causes the syringe pump 121 to push out the fluid 95 therefrom by controlling the operation of the syringe pump 121 so that the fluid 95 is dispensed from the dispensing opening 113 of the fluid dispenser 110 as shown in FIG. 4(A). Simultaneously, the controller 130 moves the fluid dispenser 110 along the end face 91 of the glass substrate 90 by controlling the operation of the Y-axis drive mechanism 124 and the X-axis drive mechanism 125.

As shown in FIG. 4(B), when the fluid dispenser 110 reaches a corner portion of the end face 91 or a curved portion of the recess 92, the controller 130 changes the direction (orientation) of the fluid dispenser 110 by controlling the operation of the θ-axis drive mechanism 123 such that the dispensing opening 113 always faces straight toward the curved end face 91. As a result, the fluid 95 dispensed from the dispensing opening 113 is applied to the end face 91 of the glass substrate 90. In each of FIGS. 4(A) to 4(C), the direction of advance of the nozzle 112 is indicated by a broken line arrow.

Figure 5:
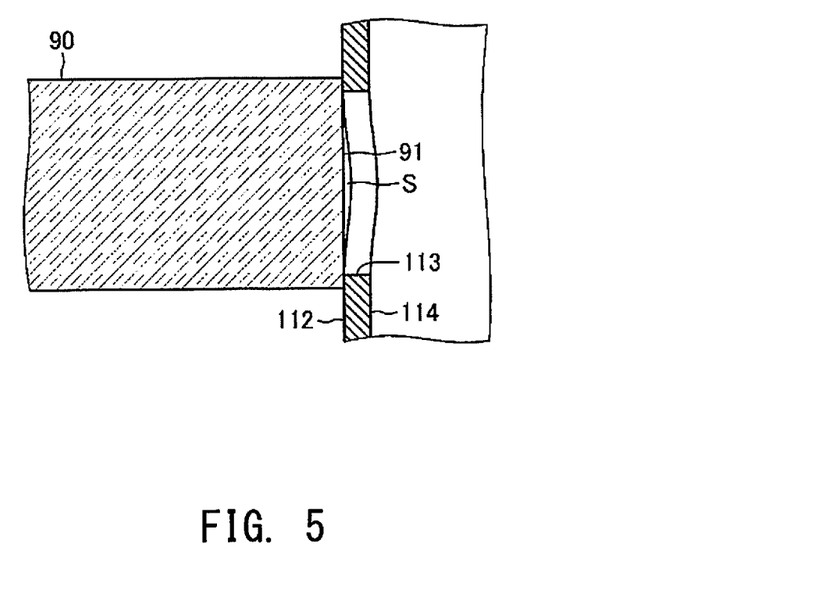
FIG. 5 is a sectional view showing a state in which the nozzle of the end face coating apparatus shown in FIG. 1 is in contact with an end face of a glass substrate.

In the end face coating apparatus 100, in the course of applying the fluid 95 to the end face 91, the moving nozzle 112 may come into contact with the end face 91 as shown in FIG. 5 due to a variation in the accuracy of forming the glass substrate 90. Even in such a case, the dispensing opening 113 is not completely closed, and a partial opening S (an unclosed portion of the dispensing opening 113) remains because the nozzle 112 has a cylindrical shape and its outer circumferential surface is a curved surface. Accordingly, even when the nozzle 112 comes into contact with the end face 91 in the course of applying the fluid 95 to the end face 91, the end face coating apparatus 100 can apply the fluid 95 precisely while continuing to dispense the fluid 95. In FIG. 5, the fluid 95 is not illustrated.

Subsequently, after the application of the fluid 95 to the end face 91 of the glass substrate 90 along the entire outer circumference (the four sides) including the recess 92 is completed, the controller 130 performs an operation of applying the fluid 95 to an end face 91 along the inner circumference of the hole 93 of the glass substrate 90. Specifically, the controller 130 moves the fluid dispenser 110, which has been raised to a position above the glass substrate 90, to a position above the hole 93, and it then moves the fluid dispenser 110 downward so that the fluid dispenser 110 enters the hole 93 as shown in FIG. 4(C). Subsequently, while dispensing the fluid 95 from the dispensing opening 113 by controlling the operation of the syringe pump 121, the controller 130 moves the fluid dispenser 110 in the X-axis direction, the Y-axis direction, and the θ-axis direction, thereby applying the fluid 95 to the end face 91 of the hole 93.

After completion of the application of the fluid 95 to the end face 91 along the outer circumference of the glass substrate 90 and the end face 91 along the inner circumference of the hole 93, the controller 130 moves the fluid dispenser 110 away from a region around the glass substrate 90. Subsequently, the controller 130 irradiates the fluid 95 applied to the end face 91 with ultraviolet rays. As a result, the controller 130 can cure the fluid 95 applied to the end face 91 of the glass substrate 90, thereby forming the protective layer 94. The controller 130 then releases the glass substrate 90 from the state of being held by the workpiece holder 101. As a result, the operator can remove the glass substrate 90 having the protective layer 94 formed on the end face 91 of the glass substrate 90 from the end face coating apparatus 100.

As can be understood from the above description of operation, in the end face coating apparatus 100 of the embodiment described above, the nozzle 112 having the dispensing opening 113 for dispensing the fluid 95 is disposed such that the dispensing opening 113 faces the end face 91 of the glass substrate 90, which is an object to be coated, and the dispensing opening 113 has a size equal to or smaller than the width of the end face 91 as measured in the thickness direction of the glass substrate 90. Therefore, the fluid 95 can be applied precisely only to the end face 91 of the glass substrate 90. Furthermore, in the end face coating apparatus 100, the nozzle 112 extends in a direction orthogonal to the main faces of the glass substrate 90. Therefore, the fluid 95 can be applied not only to the end face 91 of the glass substrate 90 along the outer circumference thereof but also to the end face 91 along the inner circumference of the hole 93.

The present invention is not limited to the above-described embodiment, and it may be modified in various ways without departing from the scope of the present invention. In each of the modifications mentioned below, structural portions identical with those of the end face coating apparatus of the above-described embodiment are denoted by the same reference numerals as those used for the end face coating apparatus, and their descriptions will not be repeated.

In the embodiment described above, the controller 130 controls the orientation of the nozzle 112 by controlling the operation of the θ-axis drive mechanism 123 such that the dispensing opening 113 faces the end face 91. Namely, the θ-axis drive mechanism 123 corresponds to the rotation means of the present invention. However, the controller 130 can control the orientation of the nozzle 112 such that the dispensing opening 113 faces toward a direction other than the direction orthogonal to the direction of advance of the nozzle 112 during application of the fluid 95. For example, the dispensing opening 113 may face in an obliquely forward direction or an obliquely rearward direction with respect to the direction orthogonal to the direction of advance.

Figure 6:
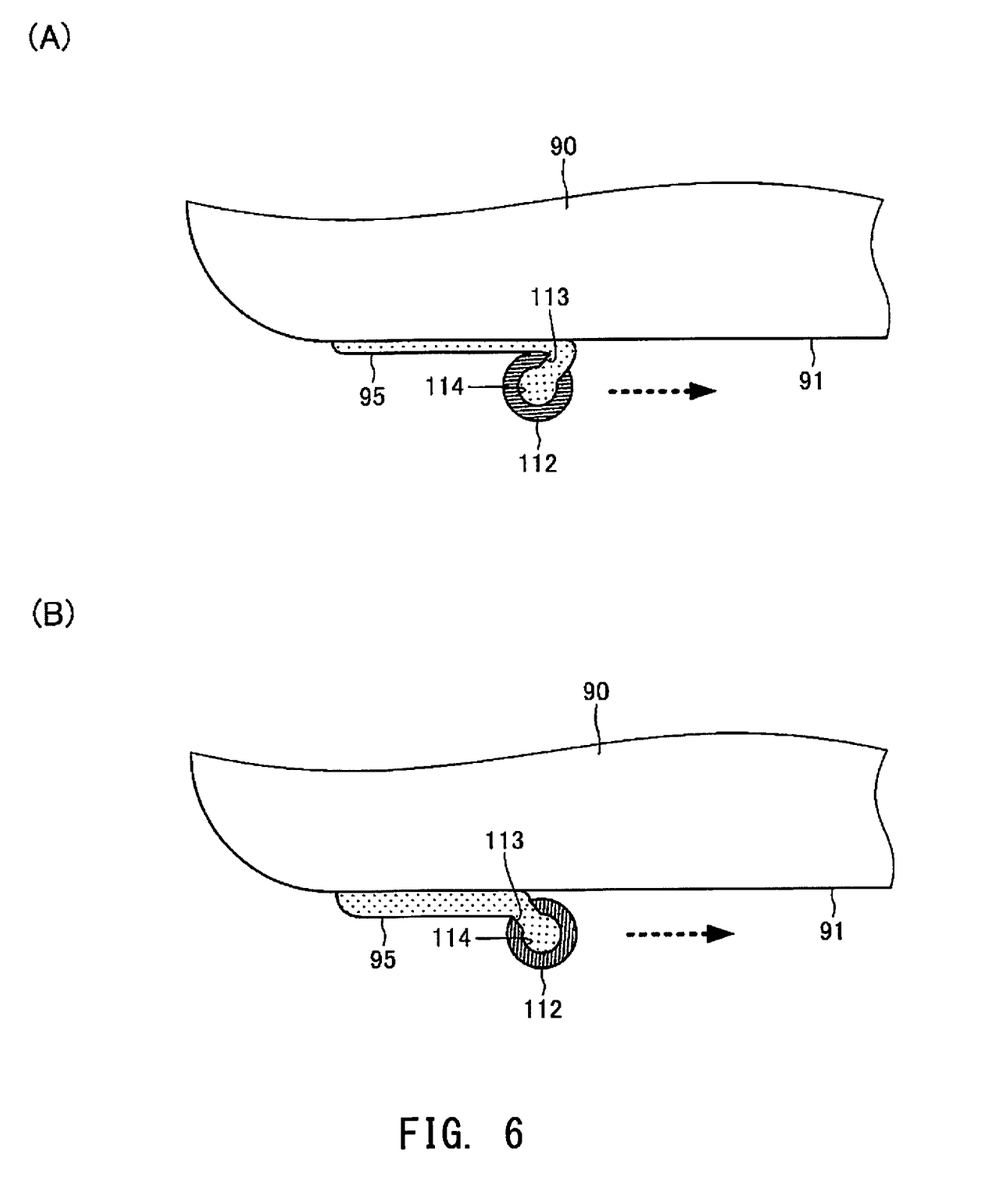
FIG. 6(A) shows a state in which a dispensing opening of the nozzle faces toward the direction of advance of the nozzle.
FIG. 6(B) shows a state in which the dispensing opening of the nozzle faces toward the side opposite from the direction of advance of the nozzle.

For example, as shown in FIG. 6(A), the controller 130 can control the orientation of the nozzle 112 such that the dispensing opening 113 faces toward the front side in the direction of advance of the nozzle 112. In this case, the layer of the applied fluid 95 can have a constant thickness and a flat surface. Also, in this case, the controller 130 can decrease the size of the clearance C between the nozzle 112 and the end face 91 by causing the nozzle 112 to approach the end face 91 of the glass substrate 90, thereby precisely performing the application of a fluid 95 so as to form a protective layer having a smaller thickness. Also, as shown in FIG. 6(B), the controller 130 can control the orientation of the nozzle 112 such that the dispensing opening 113 faces toward the rear with respect to the direction of advance of the nozzle 112. In this case, the layer of the applied fluid, i.e., the protective layer 94, has a thickness greater than the clearance C between the nozzle 112 and the end face 91, and the protective layer 94 has a convexly curved surface. In FIGS. 6(A) and 6(B), the direction of advance of the nozzle 112 is indicated by a broken line arrow.

In the end face coating apparatus 100, in the case where the nozzle 112 does not need to be rotated about the Z axis (for example, in the case where the fluid 95 is applied to only one straight end face of the glass substrate 90), the θ-axis drive mechanism 123, namely, the rotation means may be omitted. In this case, the end face coating apparatus 100 can be made simpler in structure and can be reduced in size.

In the embodiment described above, the controller 130 positions the fluid dispenser 110 at a position on the end face 91 of the glass substrate 90 at which the application of the fluid 95 is started by controlling the operation of the Z-axis drive mechanism 122, the Y-axis drive mechanism 124, and the X-axis drive mechanism 125. Namely, the Z-axis drive mechanism 122, the Y-axis drive mechanism 124, and the X-axis drive mechanism 125 correspond to the dispenser displacement means of the present invention. However, the dispenser displacement means is not limited to that employed in the embodiment described above, so long as the dispenser displacement means can produce relative movement of the fluid dispenser 110 with respect to the glass substrate 90. Namely, the dispenser displacement means may be composed of at least one of the Z-axis drive mechanism 122, the Y-axis drive mechanism 124, and the X-axis drive mechanism 125. Also, the dispenser displacement means may move the workpiece holder 101 instead of or in addition to the fluid dispenser 110.

In the embodiment described above, the controller 130 adjusts the amount of the fluid 95 dispensed from the dispensing opening 113 such that the fluid 95 is applied only to the end face 91. However, the controller 130 may increase the amount of the fluid 95 dispensed from the dispensing opening 113 such that the fluid 95 is applied not only to the end face 91 but also to edge portions of the two main faces of the glass substrate 90 located adjacent to the end face 91.

In the embodiment described above, the end face 91 of the glass substrate 90 is flat. However, the shape of the end face 91 of the glass substrate 90 need not be defined by a single flat surface, and the end face 91 may have chamfered edge portions. Alternatively, the entire end face 91 may be a curved surface.

In the embodiment described above, the nozzle 112 has the shape of a circular tube with a bottom. Namely, at least a portion of the outer circumferential surface of the nozzle 112 is a curved surface. Therefore, even when the nozzle 112 comes into contact with the end face 91 of the glass substrate 90, it is possible to prevent the dispensing of the fluid from being stopped as a result of the dispensing opening 113 being completely closed. However, it is sufficient for the nozzle 112 to have a tubular shape extending in a direction orthogonal to the main faces of the glass substrate 90 held on the workpiece holder 101. Accordingly, the nozzle 112 may have any shape other than a cylindrical shape. For example, the nozzle 112 may have a rectangular cross section, a polygonal cross section, or an elliptical cross section.

In the embodiment described above, the dispensing opening 113 is a circular hole having a diameter smaller than the width of the end face 91 as measured in the thickness direction of the glass substrate 90. However, the dispensing opening 113 is not limited to the circular opening employed in the embodiment described above so long as the size of the dispensing opening 113 is equal to or smaller than the width of the end face 91 as measured in the thickness direction of the glass substrate 90. For example, the dispensing opening 113 may be a circular hole with a diameter equal to the width of the end face 91 as measured in the thickness direction of the glass substrate 90 or a non-circular hole.

In the embodiment described above, the workpiece holder 101 is configured such that the holding surface 102 extends horizontally. However, the configuration of the workpiece holder 101 is not limited to that employed in the above-described embodiment so long as the workpiece holder 101 can hold the glass substrate 90. Accordingly, the workpiece holder 101 may be configured such that the holding surface 102 extends in the vertical direction.

In the embodiment described above, the workpiece holder 101 is configured to hold a single glass substrate 90. However, the workpiece holder 101 may be configured to hold a plurality of glass substrates 90.

Figure 7:
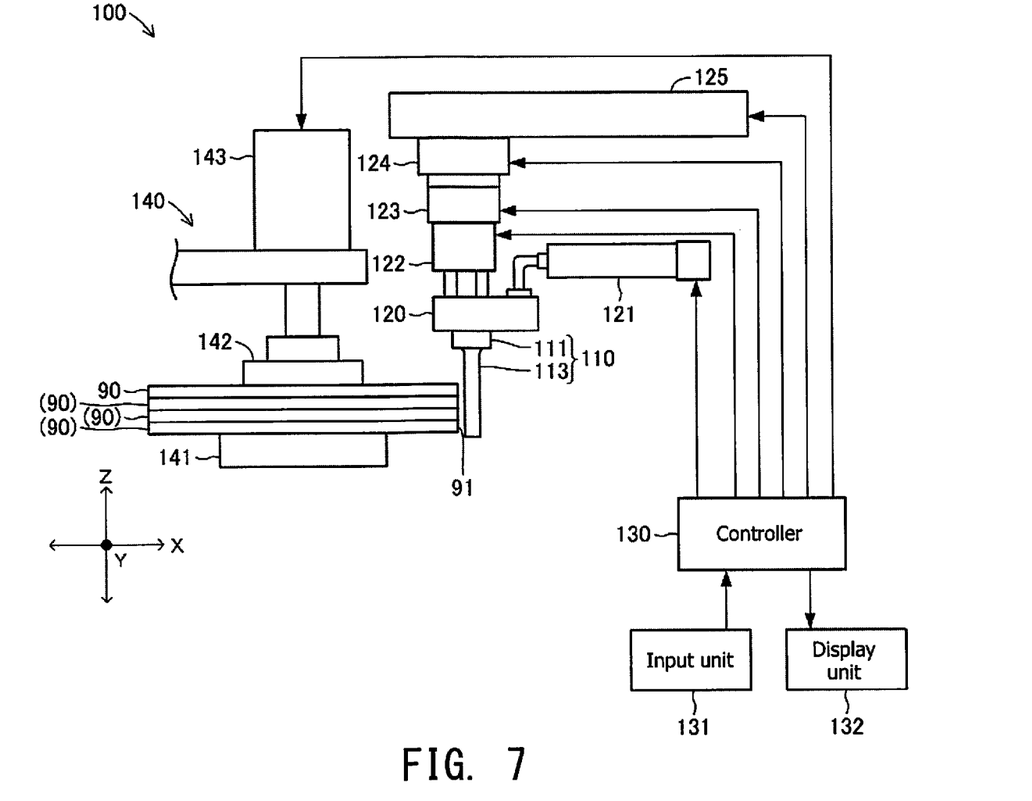
FIG. 7 is a diagram schematically showing the structure of a main portion of an end face coating apparatus according to another modification of the present invention.

For example, as shown in FIG. 7, the end face coating apparatus 100 may include a workpiece holder 140 which can hold a plurality of glass substrates 90 in a stacked state. The workpiece holder 140 is mainly composed of a pedestal 141, a pressing body 142, and a pressing cylinder 143.

The pedestal 141 is a plate-shaped metal table for supporting the plurality of glass substrates 90 in a stacked state and has a size determined such that the end faces 91 of the glass substrates 90 project from the pedestal 141. The pressing body 142 is a component for pressing the glass substrates 90 on the pedestal 141 from the upper side in FIG. 7 and is composed of a metal tube and a metal plate attached to the distal end of the metal tube. The pressing cylinder 143 is a drive source for advancing the pressing body 142 toward the pedestal 141 and retracting the pressing body 142. The pressing cylinder 143 is a pneumatic cylinder which is controlled by the controller 130. The pressing cylinder 143 is supported by a support base (not shown) provided in the end face coating apparatus 100.

Figure 8:
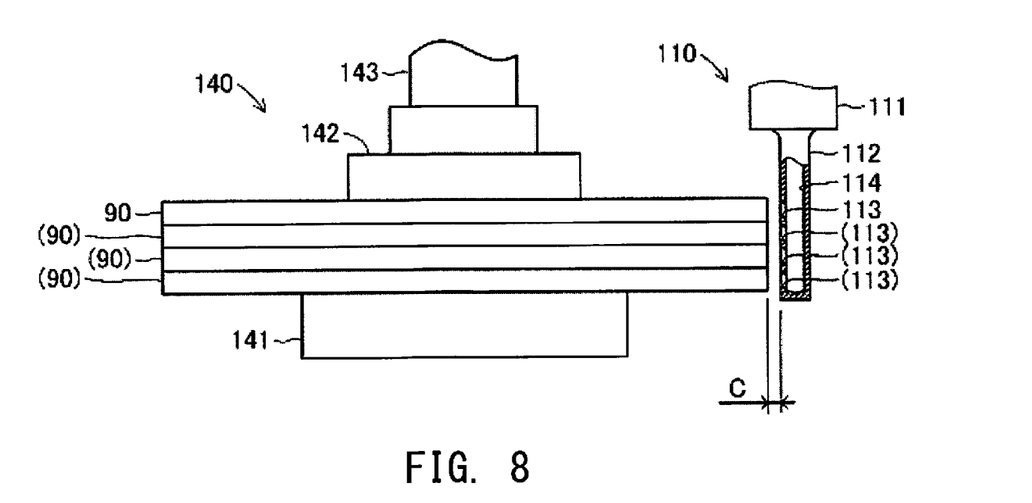
FIG. 8 is a sectional view schematically showing the internal structure of a nozzle of a fluid dispenser used in the end face coating apparatus shown in FIG. 7.

The end face coating apparatus 100 includes a fluid dispenser 110 for applying the fluid 95 to the end faces 91 of the glass substrates 90 disposed on the pedestal 141. As shown in FIG. 8, the nozzle 112 of the fluid dispenser 110 extends in the stacking direction of the glass substrates 90 disposed on the pedestal 141 and has a plurality of dispensing openings 113 formed at positions corresponding to the end faces 91 of the stacked glass substrates 90. The fluid 95 is not illustrated in FIG. 8.

The X-axis drive mechanism 125 of the end face coating apparatus 100 is provided to cause the fluid dispenser 110 to approach or separate from respective portions of the end faces 91 of the glass substrates 90 held by the workpiece holder 140, which portions project in one direction (rightward in FIG. 7).

In the case of the end face coating apparatus 100 having the above-described structure, an operator stacks a plurality of glass substrates 90 on the pedestal 141 and then instructs the controller 130 to clamp the glass substrates 90 by operating the input unit 131. In response to this instruction, the controller 130 moves the pressing body 142 downward by controlling the operation of the pressing cylinder 143. As a result, the glass substrates 90 are sandwiched and held between the pedestal 141 and the pressing body 142.

Subsequently, through the input unit 131, the operator instructs the controller 130 to start the operation of applying the fluid 95. In response to this instruction, the controller 130 positions the fluid dispenser 110 with respect to the end faces 91 of the glass substrates 90 and moves the fluid dispenser 110 along the projecting portions of the end faces 91 while dispensing the fluid 95. As a result, the fluid 95 can be applied to the projecting portions of each of the end faces 91 at the same time. Therefore, the end face coating apparatus 100 can effectively apply the fluid 95 to the plurality of glass substrates 90.

In the end face coating apparatus 100, the fluid 95 is applied to the respective portions of the end faces 91 of the glass substrates 90 held by the workpiece holder 140, which portions project in one direction (rightward in FIG. 7). Therefore, when the fluid 95 is to be applied to different portions of the end faces 91 which project in a different direction, the glass substrates 90 are released and are held again in a different orientation. The operation of re-holding the glass substrates 90 may be omitted by modifying the end face coating apparatus 100 such that the fluid dispenser 110 can be moved around the glass substrates 90 as in the case of the embodiment described above, or such that a workpiece rotation mechanism is provided so as to rotate the glass substrates 90 held on the workpiece holder 140, thereby changing their orientation.

In the embodiment described above, the fluid 95 is of a resin material for protecting the end face 91 of the glass substrate 90. However, the fluid 95 may be any fluid material other than a protective material. For example, the fluid 95 may be an adhesive or a coating material in fluid form which prevents leakage of light from the end face 91 of the glass substrate 90. In this case, the material which prevents leakage of light from the end face 91 of the glass substrate 90 may be an opaque or colored paint (for example, a paint of a dark color such as black or a light color such as white) which does not allow passage of light therethrough.

DESCRIPTION OF SYMBOLS

C . . . clearance, S . . . unclosed portion of dispensing opening,
90 . . . glass substrate, 91 . . . end face, 92 . . . recess, 93 . . . hole, 94 . . . protective layer, 95 . . . fluid,
100 . . . end face coating apparatus,
101 . . . workpiece holder, 102 . . . holding surface, 103 . . . suction pump,
110 . . . fluid dispenser, 111 . . . trunk portion, 111a . . . attachment portion, 112 . . . nozzle, 113 . . . dispensing opening, 114 . . . flow passage,
120 . . . holder, 121 . . . syringe pump, 122 . . . Z-axis drive mechanism, 123 . . . θ-axis drive mechanism, 124 . . . Y-axis drive mechanism, 125 . . . X-axis drive mechanism,
130 . . . controller, 131 . . . input unit, 132 . . . display unit,
140 . . . workpiece holder, 141 . . . pedestal, 142 . . . pressing body, 143 . . . pressing cylinder.

The invention claimed is:

1. An end face coating apparatus comprising:
a workpiece holder for detachably holding a plate-shaped glass substrate;
a fluid dispenser including a nozzle for dispensing a fluid, the nozzle comprising a tube which has a closed end, a longitudinal axis which is perpendicular to a main face of the glass substrate, an outer peripheral surface which has a curved portion, the curved portion being curved as viewed in a transverse cross section of the nozzle which is perpendicular to the longitudinal axis of the tube, and a dispensing opening which is formed in the curved portion of the outer peripheral surface and opposes an end face of the glass substrate and which has a size measured in a thickness direction of the glass substrate which is less than or equal to a thickness of the glass substrate;
a fluid supply mechanism which is fluidly connected to the fluid dispenser and supplies the fluid to the nozzle;
a first drive mechanism which produces relative movement of the glass substrate and the nozzle parallel to the main face of the glass substrate; and
a controller which controls the fluid supply mechanism and the first drive mechanism such that the fluid is dispensed from the dispensing opening of the tube onto the end face of the glass substrate as the glass substrate and the nozzle undergo the relative movement.

2. An end face coating apparatus as claimed in claim 1 further comprising a rotational second drive mechanism which is operatively connected to the nozzle to rotate the nozzle about the longitudinal axis of the tube.

3. An end face coating apparatus as claimed in claim 1 wherein the outer peripheral surface of the tube includes a cylindrical portion, and the dispensing opening is formed in the cylindrical portion.

4. An end face coating apparatus comprising:
a workpiece holder which can simultaneously hold a plurality of plate-shaped glass substrates parallel to each other in a stacked state;
a fluid dispenser including a nozzle for dispensing a fluid, the nozzle comprising a tube which has a closed end, an outer peripheral surface, a longitudinal axis which is perpendicular to a main face of each glass substrate, and a plurality of dispensing openings formed in the outer peripheral surface of the tube and spaced from each other in a lengthwise direction of the tube, each of the dispensing openings being formed in the tube at a position opposing an end face of a corresponding one of the plurality of glass substrates held on the workpiece holder, each of the dispensing openings having a size measured in a thickness direction of the corresponding glass substrate which is less than or equal to a thickness of the corresponding glass substrate;
a fluid supply mechanism which is fluidly connected to the fluid dispenser and supplies the fluid to the nozzle;
a drive mechanism which produces relative movement of the glass substrates and the nozzle parallel to the main face of each glass substrate; and
a controller which controls the fluid supply mechanism and the drive mechanism such that the fluid is dispensed from the dispensing openings of the tube onto the end face of each glass substrate as the glass substrates and the nozzle undergo the relative movement.

5. An end face coating arrangement comprising:
a workpiece holder;
a first plate-shaped glass substrate detachably held by the workpiece holder, the first glass substrate having a main face and an end face extending around an outer periphery of the first glass substrate;
a second plate-shaped glass substrate detachably held by the workpiece holder in a stacked relationship with respect to the first glass substrate, the second glass substrate having a main face which is parallel to the main face of the first glass substrate and an end face extending around an outer periphery of the second glass substrate;
a fluid dispenser including a nozzle for dispensing a fluid, the nozzle comprising a tube which has a fluid inlet, a closed end, an outer peripheral surface, a longitudinal axis which is perpendicular to the main face of the first glass substrate, a first dispensing opening which is formed in the outer peripheral surface and opposes the end face of the first glass substrate and which has a size measured in a thickness direction of the first glass substrate which is less than or equal to a thickness of the first glass substrate, and a second dispensing opening which is formed in the outer peripheral surface of the tube and which is spaced from the first dispensing opening in a lengthwise direction of the tube and which opposes the end face of the second glass substrate and which has a size measured in a thickness direction of the second glass substrate which is less than or equal to a thickness of the second glass substrate;
a fluid supply mechanism which is fluidly connected to the fluid dispenser and supplies a fluid for coating the first and second glass substrates to the fluid inlet of the tube;
a first drive mechanism which produces relative movement of the first and second glass substrates and the nozzle parallel to the main face of the first glass substrate and the main face of the second glass substrate; and
a controller which controls the fluid supply mechanism and the first drive mechanism such that the fluid supplied by the fluid supply mechanism is dispensed from the first dispensing opening of the tube onto the end face of the first glass substrate and is dispensed from the second dispensing opening of the tube onto the end face of the second glass substrate as the first and second glass substrates and the nozzle undergo relative movement parallel to the main face of the first glass substrate and the main face of the second glass substrate to apply a layer of the fluid supplied by the fluid supply mechanism to each end face, each layer of the fluid having a leading edge which advances in a direction of advance along a circumference of the corresponding end face as the first and second glass substrates and the nozzle undergo the relative movement.

6. An arrangement as claimed in claim 5 further comprising a rotational second drive mechanism which is controlled by the controller and which is operatively connected to the nozzle to rotate the nozzle about the longitudinal axis of the tube and adjust an orientation of the first and second dispensing openings with respect to the end face of the first glass substrate and the end face of the second glass substrate.

7. An arrangement as claimed in claim 6 wherein the controller controls the second drive mechanism so as to maintain a constant angle of the first and second dispensing openings with respect to the end faces of the first and second glass substrates as the nozzle and the first and second glass substrates undergo the relative movement.

8. An end face coating apparatus comprising:
a workpiece holder for detachably holding a plate-shaped glass substrate;
a fluid dispenser including a nozzle for dispensing a fluid, the nozzle comprising a tube which has a closed end, an outer peripheral surface, a longitudinal axis which is perpendicular to a main face of the glass substrate, and a dispensing opening which is a circular through hole which is formed in the outer peripheral surface of the tube and opposes an end face of the glass substrate and which has a size measured in a thickness direction of the glass substrate which is less than or equal to a thickness of the glass substrate;
a fluid supply mechanism which is fluidly connected to the fluid dispenser and supplies the fluid to the nozzle;
a drive mechanism which produces relative movement of the glass substrate and the nozzle parallel to the main face of the glass substrate; and
a controller which controls the fluid supply mechanism and the drive mechanism such that the fluid is dispensed from the dispensing opening of the tube onto the end face of the glass substrate as the glass substrate and the nozzle undergo the relative movement.

9. An end face coating apparatus comprising:
a workpiece holder for detachably holding a plate-shaped glass substrate;
a fluid dispenser including a nozzle for dispensing a fluid, the nozzle comprising a tube which has a closed end, an outer peripheral surface, a longitudinal axis which is perpendicular to a main face of the glass substrate, and a dispensing opening which is formed in the outer peripheral surface and opposes an end face of the glass substrate and which has a size measured in a thickness direction of the glass substrate which is less than or equal to a thickness of the glass substrate, the nozzle having a single bore which extends in a lengthwise direction of the tube, the bore forming an interior of the tube;

a fluid supply mechanism which is fluidly connected to the fluid dispenser and supplies the fluid to the nozzle;

a drive mechanism which produces relative movement of the glass substrate and the nozzle parallel to the main face of the glass substrate; and a controller which controls the fluid supply mechanism and the drive mechanism such that the fluid is dispensed from the dispensing opening of the tube onto the end face of the glass substrate as the glass substrate and the nozzle undergo the relative movement.

10. A coating method comprising:

disposing the nozzle of the end face coating apparatus of claim 5 with the dispensing opening of the tube facing an end face of a first plate-shaped glass substrate detachable held by the workpiece holder of the end face coating apparatus and with the longitudinal axis of the tube orthogonal to a main face of the first glass substrate, the dispensing opening having a size measured in a thickness direction of the first glass substrate which is less than or equal to a thickness of the first glass substrate; and discharging a fluid from the dispensing opening of the tube onto the end face of the first glass substrate while producing relative movement of the first glass substrate and the nozzle parallel to the main face of the first glass substrate using the drive mechanism of the end face coating apparatus to apply a layer of the fluid to the end face, the layer having a leading edge which advances in a direction of advance along a circumference of the end face as the first glass substrate and the nozzle undergo the relative movement.

11. A method as claimed in claim 10 including applying the fluid discharged from the dispensing opening only to the end face of the first glass substrate.

12. A method as claimed in claim 10 including adjusting an orientation of the nozzle so that the fluid is discharged from the dispensing opening in a direction which is orthogonal to the end face of the first glass substrate.

13. A method as claimed in claim 10 including adjusting an orientation of the nozzle so that the fluid is discharged from the dispensing opening in a direction which is nonorthogonal to the end face of the first glass substrate.

14. A method as claimed in claim 10 including discharging the fluid from the dispensing opening in direction having a component opposite to the direction of advance of the leading edge of the layer of the fluid, and the layer of the fluid has a thickness which is greater than a clearance between the nozzle and the end face of the first glass substrate.

15. A method as claimed in claim 10 including discharging the fluid from the dispensing opening in a direction having a component in the direction of advance of the leading edge of the layer of the fluid.

16. A method as claimed in claim 10 including rotating the nozzle about the longitudinal axis of the tube while producing the relative movement of the first glass substrate and the nozzle such that the dispensing opening faces in a constant direction with respect to the end face of the first glass substrate.

17. A method as claimed in claim 10 wherein the tube of the nozzle includes a plurality of dispensing openings formed in the outer peripheral surface of the tube and spaced from each other in a lengthwise direction of the tube, the method including:

placing a plurality of plate-shaped glass substrates in a stacked relationship, each glass substrate having an end face and a main face, each main face being parallel to the main face of another of the glass substrates, each dispensing opening having a size measured in a thickness direction of a corresponding one of the glass substrates which is less than or equal to a thickness of the corresponding glass substrate; and discharging the fluid from each dispensing opening onto the end face of the corresponding glass substrate while producing relative movement of the nozzle and the glass substrates parallel to the main face or each glass substrate to simultaneously apply a layer of the fluid to the end face of each glass substrate.

18. A method as claimed in claim 17 wherein the fluid discharged from each dispensing opening applied only to the end face of the corresponding glass substrate.

19. A method as claimed in claim 10 wherein the first glass substrate includes a hole spaced from an outer periphery of the first glass substrate, the hole having an end face extending around a periphery of the hole, the method including:

inserting the nozzle into the hole while maintaining the longitudinal axis of the tube orthogonal to the main face of the first glass substrate such that the dispensing opening faces the end face of the hole; and discharging the fluid from the dispensing opening onto the end face of the hole while producing relative movement of the first glass substrate and the nozzle parallel to the main face of the first glass substrate to apply a layer of the fluid to the end face of the hole, the layer applied to the end face of the hole having a leading edge which advances in a direction of advance along a circumference of the end face of the hole as the first glass substrate and the nozzle undergo relative movement parallel to the main face of the first glass substrate.

* * * * *

UNITED STATES PATENT AND TRADEMARK OFFICE
CERTIFICATE OF CORRECTION

PATENT NO. : 10,875,036 B2  
APPLICATION NO. : 16/069552  
DATED : December 29, 2020  
INVENTOR(S) : Tetsuya Shimamura Page 1 of 1

It is certified that error appears in the above-identified patent and that said Letters Patent is hereby corrected as shown below:

On the Title Page

Page 2, left column, item (56) under the heading U.S. PATENT DOCUMENTS, add the following document:
2006/0258068 A1* 11/2006 Moriya et al. .............. H01L 21/84 438/158.

In the Claims

Column 15, Lines 21 - 22 (Claim 10, Lines 2 - 3), change "coating apparatus of claim 5" to --coating apparatus of claim 1--.

Column 15, Line 24 (Claim 10, Line 5), change "detachable held by" to --detachably held by--.

Column 16, Line 34 (Claim 18, Line 2), change "dispensing opening applied" to --dispensing opening is applied--.

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*